United States Patent
Paulson et al.

(10) Patent No.: US 8,213,961 B2
(45) Date of Patent: *Jul. 3, 2012

(54) USE OF LOCAL POSITION FIX WHEN REMOTE POSITION FIX IS UNAVAILABLE

(75) Inventors: Janell Paulson, Carlsbad, CA (US); George Thomas, San Diego, CA (US); Gurunath Ramaswamy, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,691

(22) Filed: Jul. 19, 2011

(65) Prior Publication Data

US 2011/0275389 A1 Nov. 10, 2011

Related U.S. Application Data

(63) Continuation of application No. 11/634,350, filed on Dec. 5, 2006, now Pat. No. 7,991,408.

(51) Int. Cl.
H04W 24/00 (2009.01)

(52) U.S. Cl. .................................................. 455/456.3

(58) Field of Classification Search ............... 455/414.2, 455/404.2, 433, 440, 456.1–456.6, 552.1, 455/435.2, 427, 3.03, 12.1, 3.2, 98, 429, 455/407, 420, 569; 370/338, 352; 342/357.09, 342/357.07, 357.06, 357.1, 357.15, 357.12; 379/50, 59

See application file for complete search history.

(56) References Cited

U.S. PATENT DOCUMENTS

| | | | |
|---|---|---|---|
| 5,365,450 A * | 11/1994 | Schuchman et al. ........ | 455/456.3 |
| 5,422,813 A | 6/1995 | Schuchman et al. | |
| 5,442,813 A * | 8/1995 | Walters ....................... | 455/569.2 |
| 5,519,403 A * | 5/1996 | Bickley et al. ................. | 342/352 |
| 5,528,232 A * | 6/1996 | Verma et al. .................... | 340/8.1 |
| 5,537,458 A * | 7/1996 | Suomi et al. ................ | 455/556.1 |
| 5,539,810 A * | 7/1996 | Kennedy et al. ............ | 379/88.25 |
| 5,544,225 A * | 8/1996 | Kennedy et al. ............ | 455/412.1 |
| 5,546,446 A * | 8/1996 | Tsunokawa et al. ........ | 379/114.2 |
| 5,555,286 A * | 9/1996 | Tendler ....................... | 455/404.2 |
| 5,565,858 A * | 10/1996 | Guthrie ....................... | 340/10.33 |
| 5,572,204 A | 11/1996 | Timm et al. | |
| 5,587,715 A * | 12/1996 | Lewis ....................... | 342/357.24 |
| 5,594,425 A | 1/1997 | Ladner et al. | |
| 5,621,338 A | 4/1997 | Liu et al. | |
| 5,625,668 A | 4/1997 | Loomis et al. | |
| 5,627,517 A | 5/1997 | Theimer et al. | |
| 5,630,206 A * | 5/1997 | Urban et al. ............... | 455/456.1 |

(Continued)

OTHER PUBLICATIONS

International Search Report and Written Opinion issued in International Application No. PCT/US2007/084150, mailed Oct. 6, 2008, 9 pages.

Jim Deloach, Location Based Application Hands-on Considerations, printed at website http://72.14.203.104/search?q=cache:2mW9NPjxWOQJ:brew.qualcomm.com/brew_bnry/pdf/events/brew_2006/prog801_delo..., on Nov. 28, 2006, 33 pages.

(Continued)

Primary Examiner — Melody Mehrpour

(57) ABSTRACT

A mobile computing device has a transceiver circuit, a location determination circuit, and a processing circuit. The transceiver circuit is configured to receive a remote position fix from a remote computer via a wireless network. The location determination circuit is configured to receive satellite data and to calculate a local position fix. The processing circuit is configured to operate an application, to receive a request for a position fix from the application, to determine whether the remote position fix is available, and to provide the local position fix to the application based on whether the remote position fix is available.

20 Claims, 4 Drawing Sheets

U.S. PATENT DOCUMENTS

| | | | |
|---|---|---|---|
| 5,640,444 A * | 6/1997 | O'Sullivan | 455/552.1 |
| 5,650,770 A * | 7/1997 | Schlager et al. | 340/573.1 |
| 5,663,734 A * | 9/1997 | Krasner | 342/357.25 |
| 5,673,305 A * | 9/1997 | Ross | 455/517 |
| 5,726,893 A * | 3/1998 | Schuchman et al. | 455/456.3 |
| 6,011,973 A | 1/2000 | Valentine et al. | |
| 6,144,336 A | 11/2000 | Preston et al. | |
| 6,211,820 B1 | 4/2001 | Zou et al. | |
| 6,249,245 B1 | 6/2001 | Watters et al. | |
| 7,009,555 B2 | 3/2006 | Tsujimoto et al. | |
| 7,171,187 B2 | 1/2007 | Haave et al. | |
| 7,286,522 B2 | 10/2007 | Preston et al. | |
| 7,606,938 B2 | 10/2009 | Roese et al. | |
| 2005/0075116 A1 | 4/2005 | Laird et al. | |
| 2005/0250440 A1 | 11/2005 | Zhou et al. | |
| 2005/0282557 A1 | 12/2005 | Mikko et al. | |
| 2006/0035648 A1 | 2/2006 | Mohi et al. | |
| 2006/0105781 A1 | 5/2006 | Ueda et al. | |

OTHER PUBLICATIONS

Website printed at http://www.datagrid-international.com/Mk2.htm, on Nov. 28, 2006, 4 pages.

Archive for the Assisted CPS' Category, printed at website http://www.jeepx.net/?cat=4, on Nov. 28, 2006, 15 pages.

QUALCOMM, gpsOne.RTM. Position-Location Technology, 4 pages.

Make Location Aware Apps Part of the Grind with BREW, printed at website http://www.devx.com/wireless/Article/29563/1954?pf=true, on Nov. 28, 2006, 5 pages.

Office Action mailed Sep. 13, 2010, in related U.S. Appl. No. 11/634,350, filed Dec. 5, 2006.

Notice of Allowance mailed Mar. 18, 2011, in related U.S. Appl. No. 11/634,350, filed Dec. 5, 2006.

* cited by examiner

USE OF LOCAL POSITION FIX WHEN REMOTE POSITION FIX IS UNAVAILABLE

RELATED APPLICATIONS

This application is a Continuation of application Ser. No. 11/634,350, filed Dec. 5, 2006, which issues as U.S. Pat. No. 7,991,408 on Aug. 2, 2011, titled USE OF LOCAL POSITION FIX WHEN REMOTE POSITION FIX IS UNAVAILABLE, which is incorporated herein by reference in its entirety.

BACKGROUND

Some mobile computing devices provide location-based services to a user. For example, a user may use a mobile computing device to report their location to a 9-1-1 emergency service in the event of an emergency. Further, the mobile computing device may use a navigation application to provide directions from the user's current location to a desired destination.

Some location determination methods require the use of real-time wireless data from a wireless network. An alternative method uses an on-board global positioning system receiver to acquire satellite data and provide a standalone position fix. Wireless network carriers sometimes prefer that the mobile computing device use real-time wireless data instead of a standalone position fix, to maximize network usage and, accordingly, revenue. However, there are scenarios where wireless service is not available, such as when the mobile device is deep in a canyon, on a cruise ship, in a foreign country, or when there is a network failure due to a temporary block or other cause, etc. The ability to obtain a position fix may nevertheless be useful in these scenarios.

Accordingly, there is a need for a system and method for providing position fixes when real-time wireless data is unavailable. Further, there is a need for a system and method for providing a configurable location determination scheme which selectively allows standalone position fixes in accordance with wireless network carrier preferences. Further still, there is a need for a system and method for making use of a carrier's wireless network when wireless data is available, yet still allowing position fixes when the wireless data is unavailable.

The teachings herein extend to those embodiments which fall within the scope of the appended claims, regardless of whether they accomplish one or more of the above-mentioned needs.

DETAILED DESCRIPTION OF EXEMPLARY EMBODIMENTS

The disclosure of U.S. patent application Ser. No. 11/469,374 filed Aug. 31, 2006 is incorporated by reference herein in its entirety.

Figure 1:
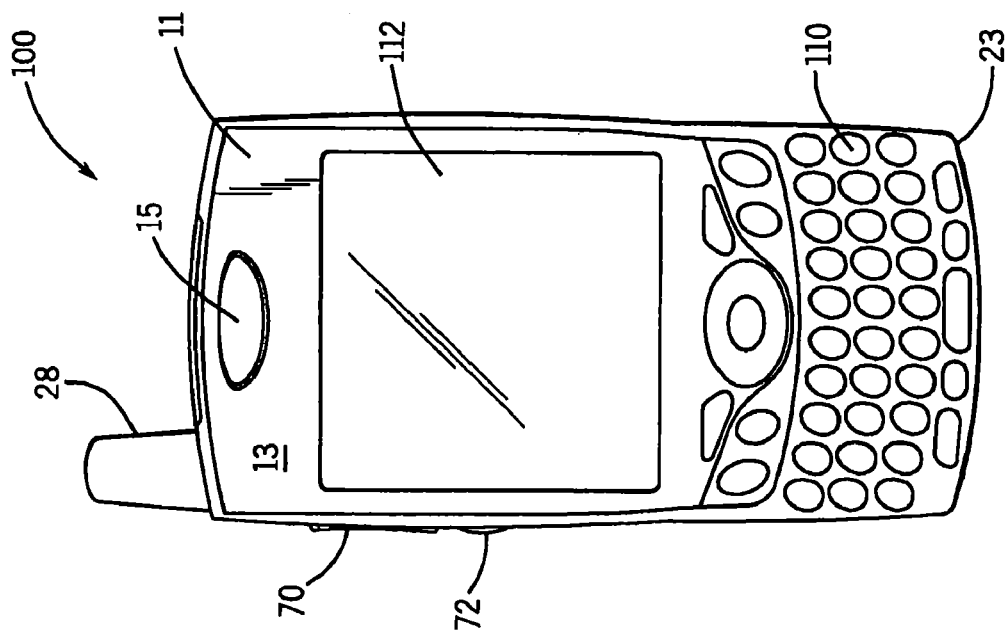
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 2:
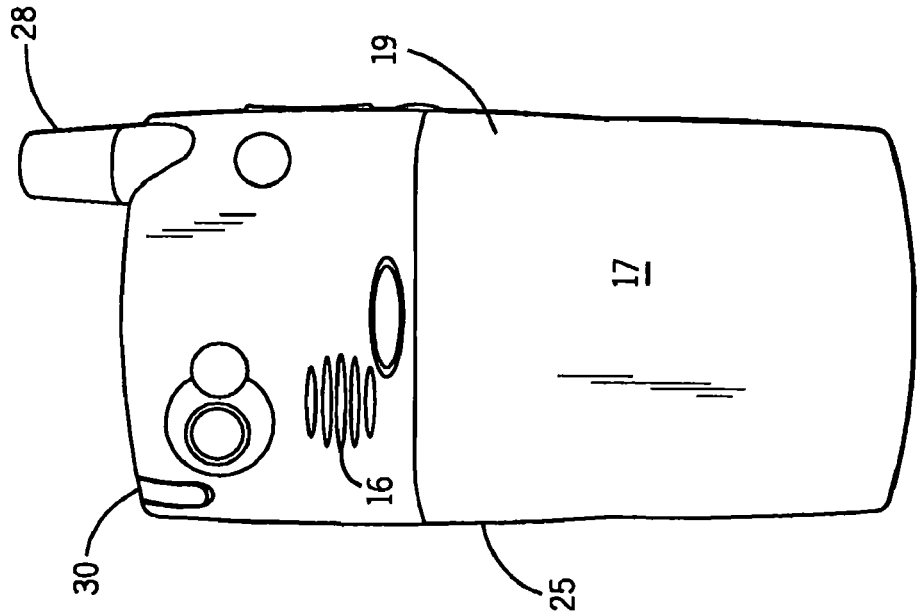
FIG. 2 is a back view of a mobile computing device, according to an exemplary embodiment.

Device 100 comprises a housing 11 having a front side 13 and a back side 17 (FIG. 2). An earpiece speaker 15 may be an electro-acoustic transducer configured to provide audio output with a volume suitable for a user placing earpiece 15 against or near the ear. Loudspeaker 16 may be an electro-acoustic transducer that converts electrical signals into sounds loud enough to be heard at a distance. Loudspeaker 16 can be a used for a speakerphone functionality. In alternative embodiments, display 112, user input device 110, earpiece 15 and loudspeaker 16 may each be positioned anywhere on front side 13, back side 17 or the edges therebetween.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 100 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 3:
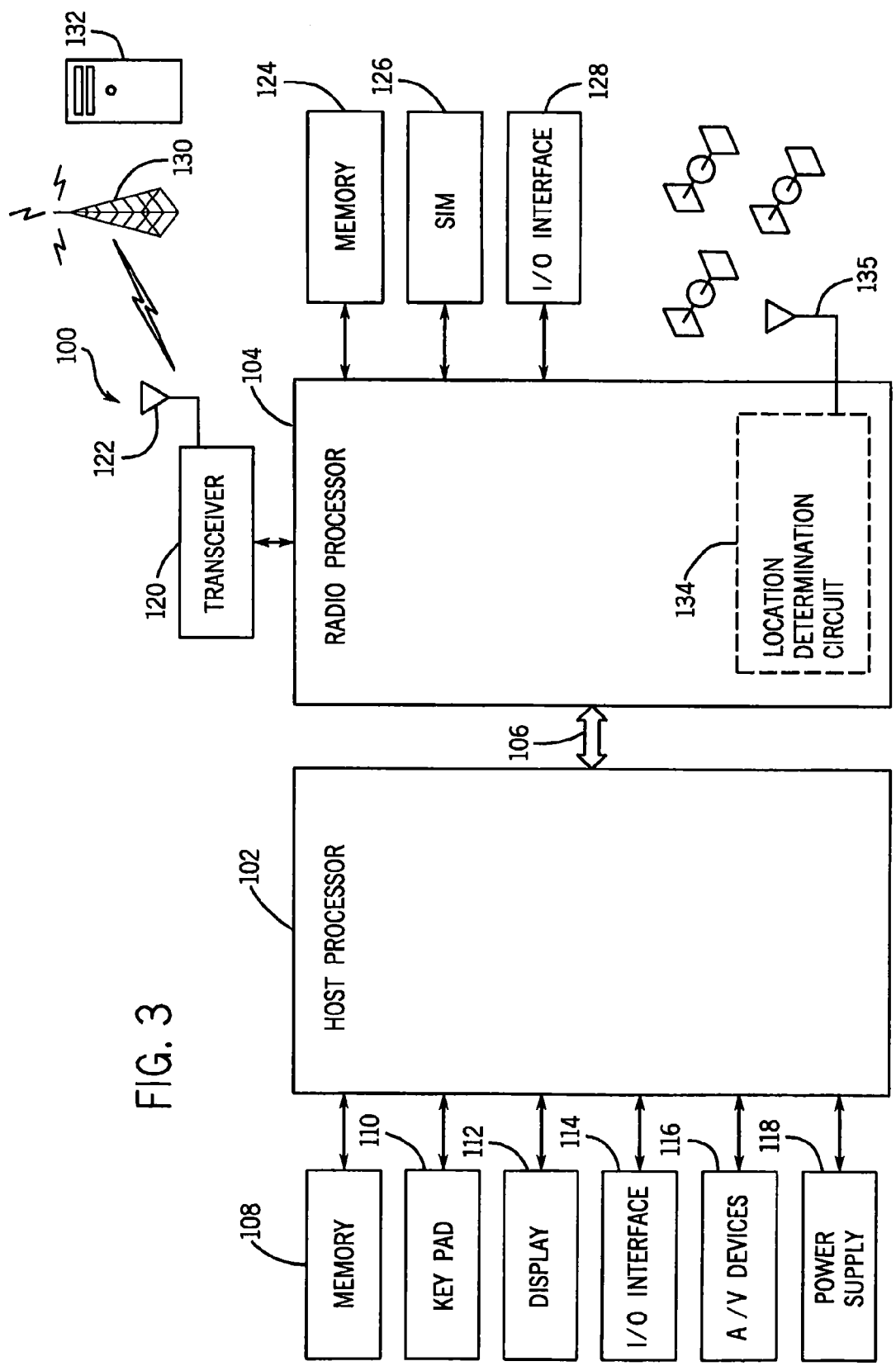
FIG. 3 is a block diagram of the mobile computing device of FIGS. 1 and 2, according to an exemplary embodiment.

As shown in the embodiment of FIG. 3, device 100 may comprise a dual processor architecture including a host processor 102 and a radio processor 104 (e.g., a base band processor), The host processor 102 and the radio processor 104 may be configured to communicate with each other using interfaces 106 such as one or more universal serial bus (USB) interfaces, micro-USB interfaces, universal asynchronous receiver-transmitter (DART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, email application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an expansion slot to support a multimedia and/or memory card, for example.

Device 100 may comprise a user input device 110 coupled to the host processor 102. The user input device 110 may comprise, for example, a QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 100. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc.

In various embodiments, the radio processor 104 may perform analog and/or digital baseband operations for device 100. For example, the radio processor 104 may perform digital-to-analog conversion (DAC), analog-to-digital conversion (ADC), modulation, demodulation, encoding, decoding, encryption, decryption, and so forth.

Device 100 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, and/or CDMA system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location determination capabilities. Device 100 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to operate in one or more location determination modes including, for example, a standalone mode, a mobile station (MS) assisted mode, and/or a MS-based mode. In a standalone mode, such as a standalone GPS mode, device 100 may be configured to determine its position without receiving wireless navigation data from the network. In a standalone mode, device 100 may comprise a local location determination circuit 134 (e.g., a GPS receiver) which may be integrated within housing 11 (FIG. 1) configured to receive satellite data via an antenna 135 and to calculate a position fix. Local location determination circuit may alternatively comprise a GPS receiver in a second housing separate from housing 11 but in the vicinity of device 100 and configured to communicate with device 100 wirelessly (e.g., via a PAN, such as Bluetooth). When operating in an MS-assisted mode or an MS-based mode, however, device 100 may be configured to communicate over a radio access network 130 (e.g., UMTS radio access network) with a remote computer 132 (e.g., a location determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 100 may be configured to determine its position using acquisition data or other wireless data from the remote computer 132. The acquisition data may be provided periodically. In various implementations, device 100 and the remote computer 132 may be configured to communicate according a suitable—MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computer device 100, the remote computer 132 may handle various processing operations and also may provide information to aid location determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the remote computer 132 may improve the speed of satellite acquisition and the probability of a position fix by concentrating the search for a GPS signal and/or may improve the accuracy of location determination. Each position fix or series of position fixes may be available at device 100 and/or at the remote computer 132 depending on the location determination mode. In some cases, data calls may be made and assisting information may be sent to device 100 from the remote computer 132 for every position fix. In other cases, data calls may be made and assistance information may be sent periodically and/or as needed.

In various embodiments, device 100 may comprise dedicated hardware circuits or structures, or a combination of dedicated hardware and associated software, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location requests and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 100 or from a source external to device 100. For example, the user of device 100 may interact with a data input device to command the LBS application to send a location request. The LBS application also may send a location request in response to receiving input from an external network element or computing device that is attempting to locate the user of device 100. In some cases, the LBS application also may be configured to automatically, periodically, and/or autonomously send location requests.

Although other applications may operate without regard to the location of device 100, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request assisting information without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide location determination capabilities for device 100. In some embodiments, the position engine may be implemented as software operating in conjunction with hardware (e.g., GPS receiver hardware) allowing device 100 to receive and process GPS satellites signals for location determination. In one embodiment, the position engine may be implemented as a QUALCOMM® gpsOne® engine.

In various implementations, the position engine may employ one or more location determination techniques such as GPS, CGI, CGI+TA, EFLT, TDOA, AOA, AFTL, OTDOA, EOTD, AGPS, GPS/AGPS, hybrid techniques, and so forth. The position engine also may be configured to operate in one or more location determination modes including a standalone mode, an MS-assisted mode, and an MS-based mode. The determined position information generated and/or obtained by the position engine generally may comprise any type of information associated with the location of device 100. Examples of position information may include, without limitation, current location, latitude, longitude, altitude, heading information, vector information such as horizontal and vertical velocity, sector-based position location, position fix information, position uncertainty, device orientation, and so forth.

Figure 4:
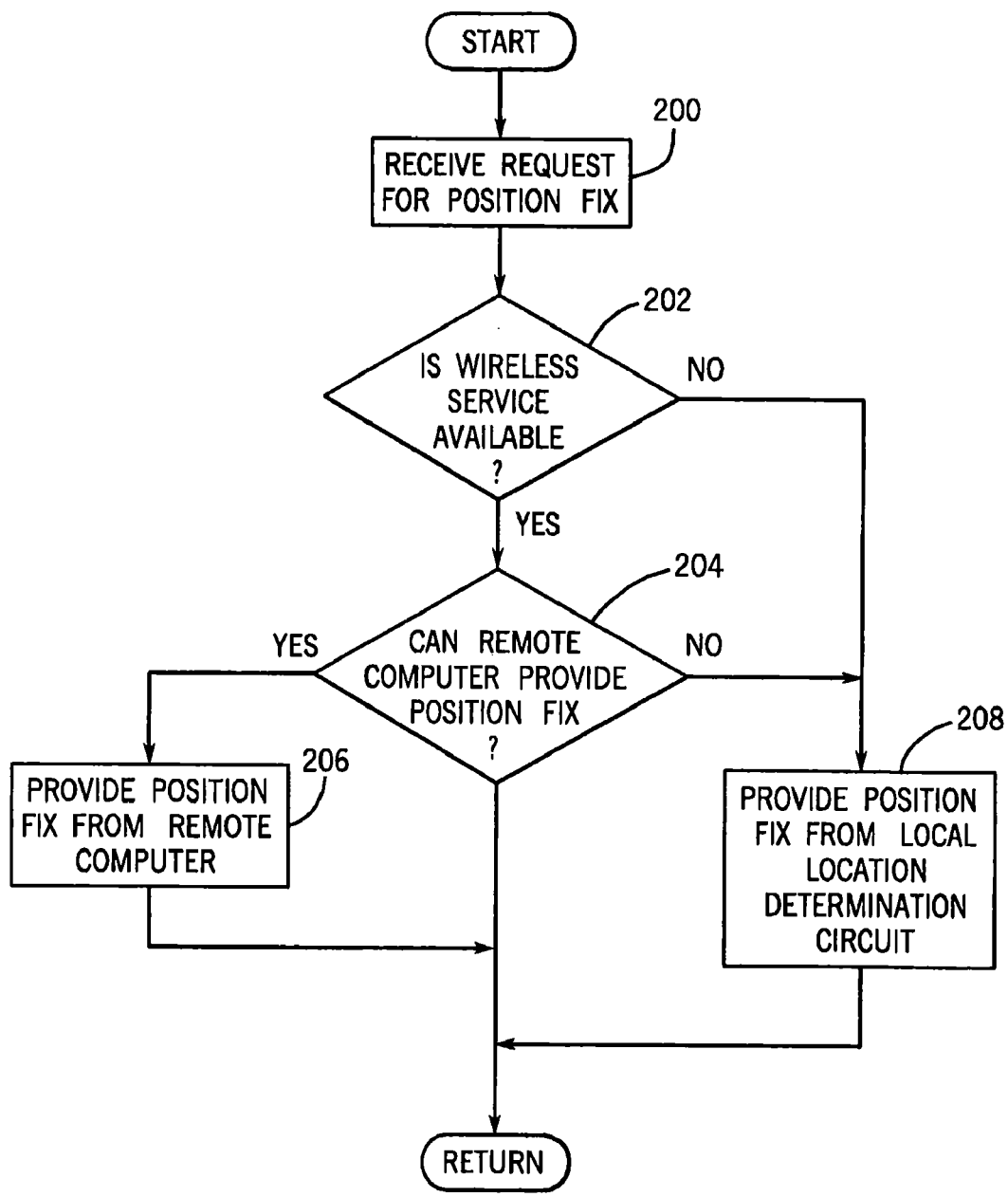
FIG. 4 is a flowchart illustrating a system and method for providing a position fix, according to an exemplary embodiment.

Referring now to FIG. 4, a system and method for providing a position fix will be described according to an exemplary embodiment. Method steps described in FIG. 4 and the alternative embodiment of FIG. 5 may be performed in one or more of host processor 102 and radio processor 104 or, in a single processor application, on the single processor. At step 200, the processor is configured to receive a request for a position fix from an application operable on the processor or operable on a nearby or remote processor. Alternatively, the request for a position fix may come from a user via key pad 110. The position fix may be data representative of a position, typically expressed in terms of a latitude and longitude, though an alternative method of expression may be used such as a bearing and range.

At step 202, device 100 is configured to determine whether device 100 has wireless service available, for example, from a wireless network operated by carrier within a range of device 100. If wireless service is available, device 100 is configured at step 204 to determine whether remote computer 132 can provide a position fix (i.e., a first, remote position fix). A position fix may not be available for remote computer 132 for any number of reasons, for example, the network remote computer 132 may return an error indicating position fix capability not supported by the base station providing network access, capability normally supported by base station but temporarily not available or not enabled, data service not available, authentication failed, other errors supported by the IS-801 standard, etc.

If remote computer 132 can provide a position fix for device 100, transceiver module 120 is configured to receive a position fix from remote computer 132 via the wireless network. The processor of device 100 is configured to provide a position fix to the application which requested the position fix based on the position fix received from remote computer 132. For example, the processor may provide the position fix from remote computer 132 to the application without further processing, calculation, or modification. Alternatively, the processor may be configured to provide further processing, calculation or modification based on additional data (e.g., satellite data received by device 100) and provide suitably a modified position fix to the application. At step 208, the processor is configured to provide a position fix (e.g., a second, local position fix) from location determination circuit 134 to the application in response to the request. The position fix provided to the application may be the same position fix provided by location determination circuit 134, or the position fix received from location determination to circuit 134 may be further processed, calculated or modified based on additional data prior to sending to the application.

Figure 5:
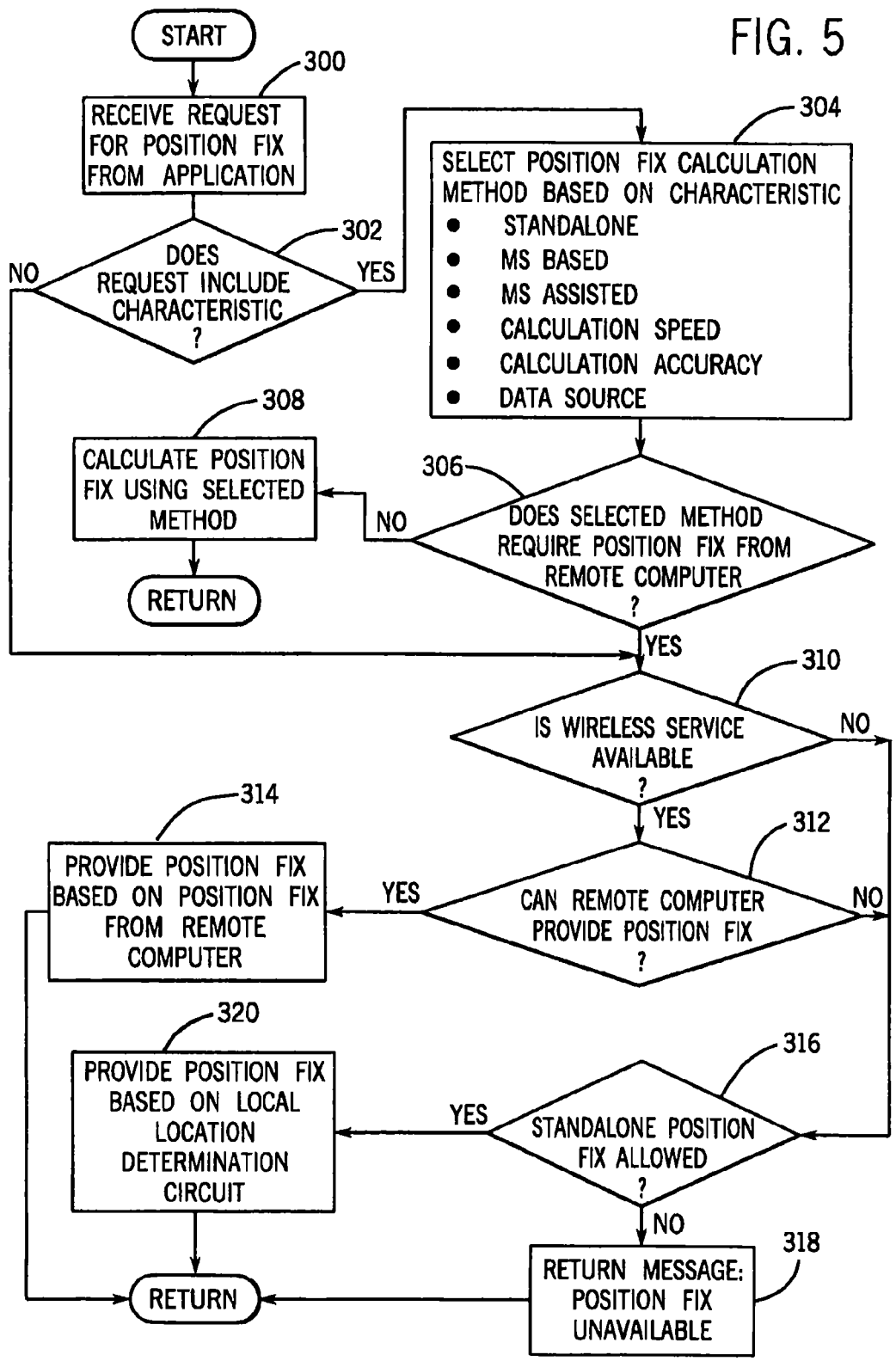
FIG. 5 is a flowchart illustrating a system and method for providing a position fix, according to an alternative embodiment.

Referring now to FIG. 5, a system and method for providing a position fix according to an alternative embodiment will be described. At step 300, the processor is configured to receive a request for a position fix from an application (e.g., an LBS application or other application). At step 302, the processor is configured to determine whether the request includes a position fix calculation characteristic. A position fix calculation characteristic may be a characteristic of the position fix calculation method that the application wishes to be used to calculate the position fix. For example, and as shown in step 304, the application may request that the position fix returned in response to the request is calculated using a standalone process, an MS-based process, or an MS-assisted process. Further, the application may request that the calculation method have a predetermined calculation speed, calculation accuracy, and/or data source (e.g., whether satellite and position data received wirelessly from remote source may be used), which may be optimal speed, optimal accuracy or may comprise a desired level of one or more of speed and accuracy. Further, based on the characteristics of calculation speed, calculation accuracy and data source, the processor may choose to use one or more of standalone, MS-based, MS-assisted or other calculation methods, or some combination thereof, to meet the characteristic or constraint or specification of the position fix request from the application. For example, a request for optimal accuracy may result in the use of the MS-assisted mode. Further, a request that the data source use as little data as possible from the wireless network may result in the calculation method applying an MS-based mode of calculation.

At step 306, the processor is configured to determine whether or not a position fix from remote computer 132 is required, such as would be required in the MS-assisted method and perhaps other methods. If a position fix from remote computer 132 is not required, at step 308, the position fix is calculated using the selected method and the position fix is provided to the application. Alternatively, if a position fix is required from remote computer 132, at step 310 the processor determines whether wireless service is available and at 312 the processor determines whether remote computer 132 can provide a position fix. If both answers are yes, at step 314 the processor provides a position fix to the application based on a position fix from remote computer 132. If the answer to either of steps 310 or 312 is no, the process continues at step 316.

At step 316, the processor is configured to determine whether a standalone position fix is allowed in a situation where the selected method requires a position fix from remote computer 132. The processor may be configured to read a flag or other memory location, which may be stored in non-volatile memory, which may indicate whether a standalone position fix is allowed. The flag can be set based on the preference of a network carrier for favoring network-based position fixes, for example, to maximize revenue. If a standalone position fix is not allowed, no position fix is provided to the application. At step 318, a message may be returned to the application and/or to the user via display 112 and/or an audio output to indicate that position fix is unavailable. If a standalone position fix is allowed, at step 320 the processor is configured to provide the position fix based on local location determination circuit 134 instead of basing the position fix calculated by remote computer 132.

It is understood that the determination of whether a position fix from remote computer 132 is available may comprise either or both of steps 310 and 312 above.

In one alternative embodiment, an additional step may be provided between steps 306 and 310 (or elsewhere in a process) to determine whether the calculation characteristic requires an MS-based position fix and a determination of whether satellite acquisition data of sufficient acceptability is available. If such data is not available (e.g., wireless service is not available) and/or the data cannot be provided within the constraints of a selected position fix calculation method, a similar determination as in steps 316, 318, 320 can be made to determine whether a fallback to standalone position calculation from MS-based calculation is allowed and to provide position fix data based on that determination.

According to one alternative embodiment, if the data request includes the characteristic that a position fix must be calculated at a remote computer 132, the processor may be configured to meet that request by not providing a position fix using the standalone mode (e.g., a local location determination circuit). In some circumstances, an application may require a calculation from remote computer 132. For example, during a test mode when a specific PDE calculation test case is being verified; if a network carrier wants to ensure that network access is required in an attempt to receive as much revenue as possible from access to the wireless network; and/or if a position request is received at device 100 from the network (e.g., is mobile terminated) and the application determines that a PDE calculation may be quicker if it can reduce the number of communications back and forth between the PDE and device 100, etc.

According to one exemplary embodiment, device 100 is configured to enable and/or disable position fixes provided in a standalone mode in real time based on the ability of device 100 to acquire wireless data suitable for receiving a position fix from remote computer 132.

According to one alternative embodiment, device 100 can be configured to automatically enable and/or disable standalone position fixes as follows: if device 100 is in a location without service, device 100 automatically enables standalone position fixes, except when the application has explicitly requested that the fix be calculated at remote computer 132; if the mobile device is in a location with service, but the network is unable to provide position fixes (e.g., via remote computer 132), then automatically enable standalone position fixes, except when the application has explicitly requested that the fix be calculated at remote computer 132; and when mobile device 100 returns to a location with service and the network is able to provide position fixes, disable these "fallback to standalone" position fixes and utilize the network for position fixes.

According to another alternative embodiment, device 100 can be configured to enable and/or disable a fallback to standalone option based on a setting, flag, or word in non-volatile memory of device 100. Device 100 may be configured to automatically (e.g., without a user pressing a button or issuing a command) switch to using standalone position fixes based on the status of a flag in non-volatile memory when position fixes are not available from remote computer 132. This embodiment provides the ability of a carrier to refuse to permit standalone position fixes even when carrier service is not available. When the fallback to standalone option is disabled, no standalone position fixes are permitted, regardless of wireless service availability. When the "fallback to standalone" option is enabled, standalone position fixes are enabled as follows: if the mobile device is in a location without service, automatically enable standalone position fixes; if the mobile device is in a location with service but the network is unable to provide position fixes, automatically enable standalone position fixes; if the mobile device returns to a location with service and the network is able to provide position fixes, disable the fall back to standalone feature and utilize the network for position fixes. A request for a standalone position fix will still be responded to with a standalone position fix.

According to another alternative embodiment, when no wireless service is available and (1) the application or user has specifically requested that the fix be calculated by remote computer 132, or (2) the non-volatile memory setting or item described in the paragraph above has been set to disable the "fallback to standalone" option, device 100 shall provide a message or indication to the application or to the user 18 that a standalone position fix may be possible and the application or user shall be given the option of overriding the setting currently blocking standalone position fixes.

According to some exemplary embodiments, device 100 is configured to give precedence to position fixes calculated by remote computer 132 using network resources over standalone position fixes, though in alternative embodiments, other precedences may be provided.

According to another alternative embodiment, if a standalone position fix is not allowed where wireless service is unavailable (e.g., as shown by the "no" result of step 316 in FIG. 5), device 100 may be configured to provide a last-known position fix to the application.

According to alternative embodiments, the various requests for position fixes described hereinabove may come from an application, from a user (e.g., a person using the device) or from another source.

According to an alternative embodiment, the flag discussed with reference to step 316 of FIG. 5 may have more than two settings (e.g., other than allow and disallow). For example, a standalone position fix can be allowed based on one or more criteria, such as the number of errors being received or the types of errors being received from remote computer 132 when the position fix from remote computer 132 is requested. Each error type may have its own configurable value of 'allow' or 'disallow', based on the carrier's or manufacturer's preference. For example, if data service is unavailable, one carrier may want standalone disallowed completely, while another carrier may want standalone allowed. Error types may include, but not be limited to: "wireless service unavailable," "device roaming," "data authentication failure," "PDE authentication failure," "data service unavailable," "wireless network failure," "base station (BS) does not support service," "BS does support service, but it is temporarily unavailable," etc.

According to one exemplary embodiment, when a request includes a characteristic of MS-based mode along with a request for a selected or desired level of calculation speed and calculation accuracy, device 100 may be configured to determine that the requested calculation speed and calculation accuracy cannot be obtained without using MS-assisted mode, and device 100 may be configured to ignore or override the request that MS-based mode be used and instead use MS-assisted mode or otherwise request some additional data from remote computer 132.

While the exemplary embodiments illustrated in the Figures and described above are presently exemplary, it should be understood that these embodiments are offered by way of example only. For example, the above steps of the various embodiments may be interchanged with other embodiments and rearranged in their order of execution. For example, in one embodiment, steps 302, 304, 306 and 308 of FIG. 5 are added to the method of FIG. 4 before step 202. Accordingly, the present invention is not limited to a particular embodiment, but extends to various modifications that nevertheless fall within the scope of the appended claims.

What is claimed is:

1. A mobile computing device, comprising:
    a transceiver circuit configured to receive a remote position fix from a remote computer via a wireless network;
    a location determination circuit configured to receive satellite data and to calculate a local position fix; and
    a processing circuit configured to:
        receive a request for a position fix from an application;
        determine, based on one or more settings of the application, a type of position fix required by the application;
        determine whether the required position fix corresponds to the remote position fix;
        determine whether the remote position fix is available; and provide the local position fix to the application when the remote position fix is unavailable.

2. The mobile computing device of claim 1, wherein the one or more settings of the application includes a characteristic of the position fix.

3. The mobile computing device of claim 2, wherein the characteristic of the position fix is selected from the group consisting of a calculation speed, a calculation accuracy, and the use of satellite acquisition data received wirelessly from a remote source.

4. The mobile computing device of claim 1, wherein the processing circuit is further configured to determine, based on one or more settings of the application, whether the local position fix is acceptable to the application when the remote position fix is not available.

5. A non-transitory computer-readable medium that stores instructions for providing a position fix for an application operating on a mobile computing device, wherein the instructions, when executed by one or more processors, cause the one or more processors to perform steps comprising:
  receiving a request from the application for a position fix, wherein the request comprises a position fix calculation characteristic;
  selecting one of a plurality of position fix calculation methods based on the position fix calculation characteristic, wherein at least one of the position fix calculation methods comprises receiving a position fix for the mobile computing device wirelessly from a remote computer;
  determining whether the position fix from the remote computer is available;
  when the position fix from the remote computer is not available, calculating a position fix using a local location determination circuit if the application is configured to accept the position fix using the local determination circuit; and
  otherwise, providing a last known position fix to the application.

6. The non-transitory computer-readable medium of claim 5, further comprising checking a flag in a memory of the mobile computing device and calculating the position fix using the local location determination circuit based on the check.

7. The non-transitory computer-readable medium of claim 6, wherein the memory is non-volatile memory.

8. The non-transitory computer-readable medium of claim 5, wherein the position fix calculation characteristic comprises a calculation speed characteristic.

9. The non-transitory computer-readable medium of claim 5, wherein the position fix calculation characteristic comprises a calculation accuracy characteristic.

10. The non-transitory computer-readable medium of claim 5, wherein the position fix calculation characteristic comprises a requirement that the selected position fix calculation method uses satellite acquisition data.

11. The non-transitory computer-readable medium of claim 5, wherein determining whether the position fix from the remote computer is available comprises determining whether a wireless network is available.

12. The non-transitory computer-readable medium of claim 5, wherein determining whether the position fix from the remote computer is available comprises determining whether data available from a wireless network is suitable for calculating the position fix using the remote computer.

13. The non-transitory computer-readable medium of claim 5, wherein the local location determination circuit is integrated within a housing of the mobile computing device.

14. The non-transitory computer-readable medium of claim 5, wherein the last known position fix is based on a position fix previously received from the remote computer.

15. A non-transitory computer-readable medium that stores instructions for providing a position fix for a mobile computing device, wherein the instructions, when executed by one or more processors, cause the one or more processors to perform steps comprising:
  receiving a request for a position fix from an application running on the computing device;
  determining whether the requested position fix can be calculated based on a position fix received wirelessly from a remote computer;
  when the position fix from the remote computer is not available, providing a position fix calculated from a local location determination circuit if the application is configured to accept the position fix calculated from the local location determination circuit; and
  otherwise, providing a last known position fix to the application.

16. The non-transitory computer-readable medium of claim 15, wherein the request for a position fix comprises a desired position fix calculation characteristic.

17. The non-transitory computer-readable medium of claim 15, further comprising checking a flag in a memory and calculating the position fix based on the local location determination circuit.

18. The non-transitory computer-readable medium of claim 16, wherein the desired position fix characteristic comprises a calculation speed characteristic.

19. The non-transitory computer-readable medium of claim 16, wherein the desired position fix characteristic comprises a calculation accuracy characteristic.

20. The non-transitory computer-readable medium of claim 15, wherein the last known position fix is based on a position fix previously received from the remote computer.

* * * * *